United States Patent [19]

Monsheimer et al.

[11] 4,293,647

[45] Oct. 6, 1981

[54] METHOD OF DISSOLVING COLLAGEN-CONTAINING TISSUES

[75] Inventors: Rolf Monsheimer, Darmstadt-Eberstadt; Ernst Pfleiderer, Darmstadt-Arheilgen, both of Fed. Rep. of Germany

[73] Assignee: Röhm GmbH, Darmstadt, Fed. Rep. of Germany

[21] Appl. No.: 882,616

[22] Filed: Feb. 28, 1978

[30] Foreign Application Priority Data

Mar. 2, 1977 [DE] Fed. Rep. of Germany ....... 2709035

[51] Int. Cl.$^3$ ............................................. C12P 21/06
[52] U.S. Cl. ...................................... 435/69; 435/913; 435/918
[58] Field of Search ........................ 195/6, 29; 435/69

[56] References Cited

U.S. PATENT DOCUMENTS

| | | | |
|---|---|---|---|
| 2,363,646 | 11/1944 | Conquest et al. | 195/6 |
| 2,480,761 | 8/1949 | Mulqueen | 195/6 |
| 3,121,049 | 2/1964 | Nisihara | 195/29 X |
| 3,131,130 | 2/1964 | Onenson | 195/6 |
| 3,314,861 | 4/1967 | Fujii | 195/6 |
| 3,529,530 | 9/1970 | Tsuzuki | 195/6 X |
| 3,530,037 | 9/1970 | Nisihara | 195/6 |
| 3,616,205 | 10/1971 | Ito et al. | 195/6 |
| 3,623,950 | 11/1971 | Monsheimer | 195/6 |
| 3,664,844 | 5/1972 | Miller | 195/6 X |

FOREIGN PATENT DOCUMENTS

| | | |
|---|---|---|
| 118851 | 11/1944 | Australia ........................ 195/6 |
| 303184 | 9/1915 | Fed. Rep. of Germany . |
| 2252281 | 5/1972 | Fed. Rep. of Germany . |
| 1450430 | 9/1966 | France . |
| 45-06274 | 7/1970 | Japan . |
| 1414634 | 11/1975 | United Kingdom . |

*Primary Examiner*—Joseph M. Golian
*Attorney, Agent, or Firm*—Curtis, Morris & Safford

[57] ABSTRACT

What is disclosed is a method for dissolving collagen-containing tissues, such as the wastes arising in leather processing, which comprises enzymatically hydrolyzing said tissues with at least one acid protease at a pH within the acid region.

11 Claims, No Drawings

METHOD OF DISSOLVING COLLAGEN-CONTAINING TISSUES

The present invention relates to a method for dissolving collagen-containing tissues such as wastes from leather processing, for example skin scraps, limed splits, machine fleshings, and the like, by enzymatic hydrolysis. The liquid hydrolyzates so obtained may thereafter be biologically decomposed or, optionally, may be further employed as industrially utilizable products.

The decomposition of skins and the like with the aid of proteolytic enzymes is known in the art. In general, the goal of the process is the industrial utilization of the products so produced. Already in 1915, it was proposed that those portions of a skin which were unsuitable for working up as leather and which were cut off after dehairing in the tannery be used: namely, the wastes, treated with dilute sodium hydroxide solution, were subjected to the influence of proteolytic enzymes and subsequently were boiled down in the usual way to make glue. However, the wastes which are produced by modern tannery technology, in particular the so-called machine fleshings, are for various reasons only accepted with hesitation, for example because of environmental pollution and, above all, because of the lack of profitability of the glue industry. The technical difficulties arising from the disposal—using proteolytic enzymes—of collagen-containing waste products from the preparation or processing of leather, as is true also of the possible further utilization of these wastes, arise from the structural properties of native collagen. The concept prevails that the intact helical regions of collagen can be effectively cleaved and dissolved only by enzymes of the collagenase type. According to this concept, acid proteases such as pepsin exclusively attack the nonhelical region of collagen. A method has been proposed for the preparation of gelatin from collagen-containing material using an acid protease. It has also been proposed to convert collagen fibers, using acid proteolytic enzymes (for example derived from *Aspergillus niger*), into a water-soluble product from which the protein can again be precipitated by neutralization with its physical properties substantially unchanged. According to this process, pepsin produces only a very incomplete solubilization of the collagen. It has also already been proposed to use certain kinds of neutral and/or alkaline proteases, which do not work like collagenases, for the preparation of a partial hydrolyzate from pieces of skin.

It has now been found that collagen-containing waste materials from leather preparation, such as skin scraps, limed splits, machine fleshings, and the like, can—because of their protein components, and particularly of those proteins having a collagen structure—be dissolved by enzymatic hydrolysis using one or more proteases, if such proteases are employed whose normal region of use lies in the acid pH range (acid proteases) and if the enzymatic reaction is carried out in the acid pH range. The hydrolysis of collagen-containing wastes from leather preparation by means of acid proteases in the acid pH range according to the present invention has proved particularly advantageous if carried out in the presence of urea. Untreated as well as treated, i.e. completely or partially denaturized, skin material can be used as the substrate for the enzymatic decompositon. In a narrower sense, the term "acid proteases" is to be understood as referring to proteolytic enzymes having a normal range of use between pH 1 and pH 6, particularly between pH 3 and pH 6, as determined by the activity optimum or the stability requirements of the enzyme.

In this, the origin of the acid proteases plays no decisive role. Enzymes obtained from higher animals and plants, as well as those obtained from microorganisms, can be used. The acid fungus proteases, for example the acid proteases derived from Aspergillus species (*Asp. oryzae, Asp. saitoi, Asp. parasiticus, Asp. usamii, Asp. awamori*), those from Paecilomyces species (*Paecilomyces varioti*), from Penicillium species (*Penicill. roqueforti., inter alia*), Acrocylindrium species, and *Trametes sanguinea*, should be especially mentioned, as well as acid proteases of plant origin such as papain, bromelain, and ficin.

Proteases of animal origin, such as pepsin, as well as the pepsin-like proteases derived from microorganisms, should also be mentioned if they are employed in combination with other proteases.

The use of acid proteases in combination is a special embodiment of the invention. Of these, the combinations of acid proteases of plant origin with fungus enzymes are preferred, for example the combination of papain with proteases from Aspergillus species (*Asp. oryzae, Asp. saitoi, Asp. parasiticus*). As mentioned, it is advantageous also to use pepsin together with acid proteases of plant origin, such as papain, bromelain, or ficin, or with acid fungus proteases, for example those derived from Aspergillus species. The amount of enzyme to be employed depends to the kind and activity of the enzyme. In general, an amount of enzyme having an activity of 100–4000 mU$_{Hb}$, preferably 200–2000 mU$_{Hb}$, at pH 7.5, is employed per gram of dry substrate. (This unit of measuring enzyme activity is described and defined hereinafter.)

Acid proteases such as pepsin and pepsin-like proteolytic enzymes are known to be impaired in their efficacy or to be denatured by urea at a certain threshold concentration. This threshold concentration is as a rule to be set above a urea content of 1 mol per liter. In view of this knowledge, it was not to be expected that urea in concentrations significantly below this threshold concentration would influence the enzyme reaction at all, whether positively or negatively. Thus, it must be considered as extraordinarily surprising that the enzymatic decomposition of collagen-containing wastes from leather preparation using acid proteases according to the present invention is promoted in a technically most-desirable manner, both from the point of view of the velocity of decomposition as well as the degree of decomposition, by the addition of urea in concentrations significantly below the above-defined threshold value. For this purpose, the preferred region of urea addition to the enzymatic batch is between 0.01 and 0.3 mol per liter, particularly between 0.03 and 0.2 mol per liter. These amounts presuppose the use of the substrates according to the invention and are applicable as well to machine fleshings having a water content of 80–90 percent by weight as to skin scraps having a water content of 30 to 50 percent by weight. Finally, it is suitable in carrying out the process according to the present invention to take into consideration the knowlege already gained by experience for the individual enzymes used.

The desired pH value can be established in conventional fashion by the addition of suitable acids, acid salts, buffers, and the like which are not harmful to the enzyme. For example, hydrochloric acid, sulfuric acid, phosphoric acid, acetic acid, and citric acid in suitable concentrations can be used as acids, as well as the acid salts of sulfuric acid and phosphoric acid.

The reaction temperature in the enzymatic process according to the invention is not really critical. Nevertheless, it is suitably chosen taking into account the characteristic data known for the individual proteases. In general, reaction temperatures between 20° C. and 60° C. are maintained. When using pepsin, for example, its pH activity maximum at pH 2.0–4.0 and the maximum permissible temperature of 50° C. should be maintained.

The process can be carried out according to the invention in the following way:

In preparing the substrate for the enzymatic reaction, it must be kept in mind that the collagen-containing waste from leather preparation normally reacts alkaline because of previous alkaline treatment. The skin wastes, skin scraps, limed splits, machine fleshings, and the like to be dissolved are suitably prepared by treatment with acid before introduction into the enzymatic batch in order to assure the maintenance of the necessary acid pH in the enzyme batch. After the introduction of the material, and after testing and—if necessary—adjustment of the pH and the temperature to the desired values, urea is optionally added. After its solution and resultant uniform distribution, the necessary amount of enzyme is added. Optionally, the substrate can also be incubated in the urea-containing solution before addition of the enzyme.

During the enzymatic reaction, a thorough mixing of the batch can be assured in the usual ways, for example by rotating, stirring, and the like. With an advancing degree of hydrolysis, the buffer effect of the liberated amino acids or oligopeptides will affect the pH of the batch. The reaction can be continued to the most advanced possible solution of the material. For this, the reaction times generally are between 1 to 5 hours.

Optionally, undissolved portions can be mechanically separated from the solution, for example by filtration, sieving, and the like.

The process according to the present invention offers the possibility of biologically decomposing the hydrolyzate of collagen-containing waste materials from leather preparation and of releasing it as an unobjectionable waste water in a pre-flooder or into the public sewer system. Optionally, the hydrolyzate can be prepared to meet requirements for biological decomposition by dilution and/or adjustment of the pH value. The process according to the present invention in this way permits the disposal of collagen-containing wastes from leather processing within a short time period, with a small consumption of energy, and in only a few process steps.

Further, the process is ecologically unobjectionable since the hydrolysis products are further utilized or can be directly released in a pre-flooder or into the public sewer system.

The hydrolysis according to the method of the invention gives soluble decomposed products of low viscosity.

In the process according to the present invention, additives known per se for the enzymatic reaction can be used, such as activators, stabilizers, etc. The proteolytic activity of enzymes is usually determined according to the Anson-Hemoglobin Method [M. L. Anson, J. Gen. Physiol. 22, 79 (1939)], or according to the Loehlein-Volhard method ["Die Loehlein-Volhard'sche Methode zur Bestimmung der proteolytischen Aktivitat", in the Gerbereichem. Taschenbuch, Dresden-Leipzig (1959)], in which case they are expressed as "LVU" (Loehlein-Volhard Units). One Loehlein-Volhard Unit is that amount of enzyme which, under the specified conditions of the method, digests 1.725 mg of casein.

A better understanding of the present invention and of its many advantages will be had by referring to the following specific Examples, given by way of illustration. In the Examples, units are employed which are derived from the Anson method for determining the activity of the enzymes which are active in the acid region. These units are designated as "proteinase-units (hemoglobin)", $U_{Hb}$. One $U_{Hb}$ corresponds to the amount of enzyme which catalyzes the release from hemoglobin of fragments, soluble in trichloroacetic acid, which are equivalent to one micromol of tyrosine per minute at 35° C. (measured at 280 nm). 1 $mU_{Hb} = 10^{-3} U_{Hb}$.

EXAMPLE 1

1000 g of glue stock from calf hides, having a dry matter content of 20% by weight, of which 10% is fat and 10% is protein, comminuted in a mincer, is weighed into a 2 liter glass beaker. Thereafter, 12 g of technical sulfuric acid (98%) are added and the mixture is warmed to 50° C. on a water bath.

With stirring, the following are added:
0.25 g of fungus proteases derived from *Aspergillus oryzae* (3000 LVU) ≙ 45 $mU_{Hb}$/mg, (pH=7.5)
0.7 g of papain (160 $mU_{Hb}$/mg, pH=7.5) and
2.0 g of ammonium sulfate (optionally present as a carrier salt which can be omitted or replaced by some other carrier salt, such as sodium sulfate).

After stirring for 1 hour, the material is hydrolyzed to more than 90%. After separation of the skin fat and residue in a separatory funnel, 800–850 g of hydrolyzate having a solids content of 13–14% are obtained. The pH value was initially 5.0. At the end of the treatment the hydrolyzate had a pH value of 6.2.

EXAMPLE 2

1000 g of machine fleshings from calf hides, having a dry matter content of 20% by weight, of which 10% is fat and 10% is protein, are weighed into a 2 liter glass beaker. After the addition of 15 g of concentrated technical sulfuric acid (98%), the material is warmed to 50° C. on a water bath.

The following are subsequently added and the mixture is then treated for 90 minutes at 50° C. on a water bath:
0.25 g of fungus protease derived from *Aspergillus saitoi* (3000 LVU) ≙ 45 $mU_{Hb}$/mg, (pH=7.5)
0.7 g of papain (160 $mU_{Hb}$/mg, pH-7.5)
4.0 g of urea, and
2.0 g of ammonium sulfate (as an optional carrier salt).

After this time, 95 percent of the material weighed in is dissolved. 900 g of hydrolyzate having a solids content of 8–10 percent are obtained after separation of the skin fat and residue. At the beginning of the treatment, a pH of 5.0 is measured. The pH value of the hydrolyzate is 6.0–6.2.

EXAMPLE 3

1000 g of glue stock from calf hides, having a dry matter content of 20% by weight, of which 10% is fat and 10% is protein, comminuted with a mincer, are weighed into a 2-liter glass beaker. The material is adjusted to a pH of 4.0 with 14 g of concentrated technical sulfuric acid (98%) and warmed on a water bath to 50° C. Thereafter, the following are added and left to react for 75 minutes on a water bath at 50° C.:

0.6 g of papain (80 mU$_{Hb}$/mg, pH=7.5),
0.25 g of pepsin (100 mU$_{Hb}$/mg, pH=5.0),
2.0 g of urea, and
7.0 g of ammonium sulfate (as an optional carrier salt). After this time, more than 90 percent of the material introduced is hydrolyzed. The hydrolyzate has a pH of 6.2 and contains 10 percent by weight of solids.

EXAMPLE 4

1000 g of glue stock from skins of adult cattle, having a dry matter content of 40% by weight, are weighed into a 2-liter glass beaker after comminution in a mincer. 15 g of concentrated sulfuric acid (98%) are then added for acidification and the mixture is heated on a water bath at 50° C. Further treatment follows at 50° C. in a water bath without agitation. The following are added:

0.5 g of pepsin (100 mU$_{Hb}$/mg, pH=5.0)
0.6 g of bromelain (80 mU$_{Hb}$/mg, pH=7.5)
2.0 g of ammonium chloride (as an optional carrier salt)
7.0 g of ammonium sulfate (as an optional carrier salt).

After a reaction time of 2½ hours, about 90 percent of the material introduced is hydrolyzed. The pH value of the suspension is adjusted to 4.0 during the period of treatment. For regulating the pH, an additional 4.0 g of concentrated sulfuric acid (98 percent) are subsequently added.

After separation of the sediment and skin fat, 880 g of hydrolyzate having a solids content of 10 percent are obtained.

EXAMPLE 5

1000 g of limed split cow hides, having a dry matter content of 40% by weight, comminuted a mincer, are weighed into a 2-liter glass beaker. 10 g of concentrated technical sulfuric acid (98%) are added for acidification and the mixture is warmed on a water bath at 50° C.

For enzymatic hydrolysis, the following are added:

0.4 g of fungus protease derived from *Aspergillus parasiticus* (3000 LVU), ≙ 45 mU$_{Hb}$/mg, (pH=7.5)
1.0 g of papain (160 mU$_{Hb}$/mg (pH=7.5)),
6.0 g of urea, and
3.0 g of ammonium sulfate (as an optional carrier salt).

After a reaction time of four hours, without agitation, at 50° C. on a water bath, 80 percent of the material introduced is hydrolyzed. 600 g of hydrolyzate having a solids content of 26 percent are obtained. The pH value of the hydrolyzate is 4.9. Under the same conditions, but without urea, only 30–40% of the material introduced is converted.

What is claimed is:

1. A method for dissolving collagen-containing tissue to form soluble decomposed products of low viscosity, which method consists essentially of enzymatically hydrolyzing said tissue by treatment with at least one acid protease at a pH within the acid region and in the presence of urea at a concentration between 0.01 mol/liter and 0.3 mol/liter.

2. A method as in claim 1 wherein said acid protease has an optimum activity in a pH between pH 1.0 and pH 6.0.

3. A method as in claim 1 wherein said acid protease is derived from an Aspergillus species.

4. A method as in claim 1 wherein said acid protease is derived from *Aspergillus oryzae, Aspergillus saitoi,* or *Aspergillus parasiticus.*

5. A method as in claim 1 wherein a plurality of different acid proteases are used in combination.

6. A method as in claim 1 wherein pepsin is used in combination with an acid fungus protease.

7. A method as in claim 1 wherein pepsin is used in combination with an acid plant protease.

8. A method as in claim 1 wherein an acid fungus protease is used in combination with an acid fungus protease.

9. A method as in claim 1 wherein from 100 mU$_{Hb}$ to 4000 mU$_{Hb}$ of enzyme, determined at pH 7.5, are used per gram of dry substrate.

10. A method as in claim 1 wherein said tissues are reacted with said acid protease for from 1 to 5 hours.

11. A method as in claim 1 wherein a urea concentration between 0.03 mol/liter and 0.2 mol/liter is present.

* * * * *